United States Patent
Toal et al.

(10) Patent No.: US 10,802,944 B2
(45) Date of Patent: Oct. 13, 2020

(54) DYNAMICALLY MAINTAINING ALARM THRESHOLDS FOR SOFTWARE APPLICATION PERFORMANCE MANAGEMENT

(71) Applicant: salesforce.com, inc., San Francisco, CA (US)

(72) Inventors: Brian Toal, San Francisco, CA (US); Dean Tupper, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 0 days.

(21) Appl. No.: 16/255,741

(22) Filed: Jan. 23, 2019

(65) Prior Publication Data
US 2020/0233775 A1    Jul. 23, 2020

(51) Int. Cl.
*G06F 9/44* (2018.01)
*G06F 11/36* (2006.01)
*G06F 16/953* (2019.01)

(52) U.S. Cl.
CPC ........ *G06F 11/3604* (2013.01); *G06F 16/953* (2019.01)

(58) Field of Classification Search
CPC ........................... G06F 11/3604; G06F 16/953
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |

(Continued)

OTHER PUBLICATIONS

David Breigand et al., Automated and Adaptive Threshold Setting: Enabling Technology for Autonomy and Self-Management, IEEE, 2005, retrieved online on Jul. 1, 2020, pp. 1-12. Retrieved from the Internet: <URL: https://ieeexplore.ieee.org/stamp/stamp.jsp?tp=&arnumber=1498065>. (Year: 2005).*

(Continued)

*Primary Examiner* — Hanh Thi-Minh Bui
(74) *Attorney, Agent, or Firm* — Schwabe Williamson & Wyatt (57) ABSTRACT

Embodiments of the present disclosure relate to dynamically maintaining alarm thresholds for software application performance management. Other embodiments may be described and/or claimed.

15 Claims, 5 Drawing Sheets

(56) References Cited

U.S. PATENT DOCUMENTS

| | | |
|---|---|---|
| 6,266,669 B1 | 7/2001 | Brodersen et al. |
| 6,288,717 B1 | 9/2001 | Dunkle |
| 6,289,506 B1 | 9/2001 | Kwong |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| 6,336,213 B1 | 1/2002 | Beadle |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B1 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,103,760 B2 | 1/2012 | Reedy |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,442,727 B2 | 9/2016 | Chou |
| 10,175,964 B2 | 1/2019 | Radigan |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0073904 A1 | 4/2004 | Hill |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0228936 A1 | 10/2005 | Kuo |
| 2006/0143350 A1 | 6/2006 | Miloushev |
| 2007/0226717 A1 | 9/2007 | Shtilman |
| 2008/0249972 A1 | 10/2008 | Dillon |
| 2009/0063415 A1 | 3/2009 | Chatfield |

(56) References Cited

U.S. PATENT DOCUMENTS

| | | |
|---|---|---|
| 2009/0100342 A1 | 4/2009 | Jakobson |
| 2009/0157359 A1 | 6/2009 | Chernoff |
| 2009/0177744 A1 | 7/2009 | Marlow et al. |
| 2010/0122260 A1 | 5/2010 | Kawachiya |
| 2011/0218958 A1 | 9/2011 | Warshaysky |
| 2011/0247051 A1 | 10/2011 | Bulumulla |
| 2011/0321019 A1 | 12/2011 | Gibbons |
| 2012/0042218 A1 | 2/2012 | Cinarkaya |
| 2012/0072656 A1 | 3/2012 | Archak |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0068343 A1* | 3/2014 | Nakajima ............ G06F 11/0751 714/39 |
| 2014/0359537 A1 | 12/2014 | Jackobson et al. |
| 2015/0074668 A1 | 3/2015 | Burka |
| 2015/0234652 A1 | 8/2015 | Naveh |
| 2016/0004582 A1* | 1/2016 | Nagura ............... G06F 11/34 714/15 |
| 2016/0080368 A1 | 3/2016 | Heurich |
| 2016/0330067 A1 | 11/2016 | Liu |
| 2016/0378583 A1* | 12/2016 | Nakano ............... G06F 11/3485 714/37 |
| 2017/0068603 A1 | 3/2017 | Tai |
| 2017/0132026 A1 | 5/2017 | Zang |
| 2017/0371766 A1 | 12/2017 | Gadi |
| 2018/0027058 A1 | 1/2018 | Balle |
| 2018/0121103 A1 | 5/2018 | Kavanagh |
| 2018/0177756 A1 | 6/2018 | Christopher et al. |
| 2018/0300067 A1 | 10/2018 | Mittal |
| 2018/0324030 A1* | 11/2018 | Dang ................ H04L 43/0817 |

OTHER PUBLICATIONS

Yang, Yan and Eric Williams, "Logistic Model-Based Forecast of Sales and Generation of Obsolete Computers in the US." Technological Forecasting and Social Change 76.8 (2009); pp. 1105-1114.

Guzman, Javier Garcia, et al. "Practical Experiences in Modelling Software Engineering Practices: The Project Patterns Approach"; Software Quality Journal 21.2 (2013); pp. 325-354.

Garcia, Javier, et al. "Design Guidelines for Software Processes Knowledge Repository Development" Information and Software Technology 53.8 (2011); pp. 834-850.

Mshelk et al. "CoMet: A Tool Using Cumm to Measure Unused Component Member" IEEE International Conference on Computer Systems and Applications (2006) Dubai, UAE, pp. 697-703.

Luo et al., "VertexRank: Importance Rank for Software Network Vertices" 2014 IEEE 38th Annual Computer Software and Applications Conference, Vasteras (2014); pp. 251-260.

Dubois et al., "Autonomic Provisioning and Application Mapping on Spot Cloud Resources" (2015) International Conference on Cloud and Autonomic Computing, Boston MA, pp. 57-68.

Alzami, Z., "Application of Redundant Computation in Program Debugging" Journal of Systems and Software, 81.11 (2008); pp. 2024-2033.

Pistoria et al. "A survey of Static Analysis Methods for Identifying Security Vulnerabilities in Software Systems"; IBM Systems Journal; 46.2 (2007); pp. 265-288.

Cho et al., "Redundancy Identification/Removal and Test Generation for Sequential Circuits Using Implicit State Enumeration", IEEE Transactions on Computer-Aided Design of Integrated Circuits and Systems; 12.7 (1993); pp. 935-945.

Cito Jurgen, "Software Runtime Analytics for Development: Extending Developer's Mental Models by Runtime Dimensions" Dissertation, Zurich, Feb. 2018; p. 216.

* cited by examiner

| _time | Startup Time (Min) |
|---|---|
| 2018-11-14 13:56:52.824 | 1.151283 |
| 2018-11-14 13:56:52.760 | 1.128660 |
| 2018-11-14 13:54:54.591 | 1.147500 |
| 2018-11-14 13:52:55.115 | 1.192483 |
| 2018-11-14 13:23:22.163 | 1.134550 |
| 2018-11-14 13:21:23.719 | 1.160517 |
| 2018-11-14 13:19:23.286 | 1.128450 |
| 2018-11-14 13:17:24.974 | 1.168217 |
| 2018-11-14 12:47:49.941 | 1.142367 |
| 2018-11-14 12:45:50.876 | 1.161300 |
| 2018-11-14 12:43:49.421 | 1.146133 |
| 2018-11-14 12:41:49.418 | 1.159683 |
| 2018-11-14 12:12:30.346 | 1.109067 |
| 2018-11-14 12:11:02.446 | 1.137333 |

```
QUERY DATABASE TO RETRIEVE
PERFORMANCE METRIC VALUES         — 405
           ↓
DETERMINE THRESHOLD VALUES         — 410
           ↓
ANALYZE PERFORMANCE METRICS        — 415
           ↓
GENERATE ALERT                     — 420
           ↓
MODIFY THRESHOLD                   — 425
           ↓
IDENTIFY PASSED RUN                — 430
```

*FIGURE 4*

DYNAMICALLY MAINTAINING ALARM THRESHOLDS FOR SOFTWARE APPLICATION PERFORMANCE MANAGEMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

Embodiments of the present disclosure relate to dynamically maintaining alarm thresholds for software application performance management. Other embodiments may be described and/or claimed.

BACKGROUND

As the size and complexity of software applications grows, so too increases the need to identify the performance characteristics of such applications. Software performance can be measured using a variety of performance metrics. However, performance thresholds are often set manually by a human operator, and changes in performance (e.g., due to a change in hardware, a software update, etc.) can run undetected for significant periods of time without being updated, particularly considering the high speeds the instructions of software applications are executed using modern computing hardware. Embodiments of the present disclosure address these and other issues.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Examples of systems, apparatuses, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for dynamically maintaining alarm thresholds for software application performance management.

I. System Examples

Figure 1A:
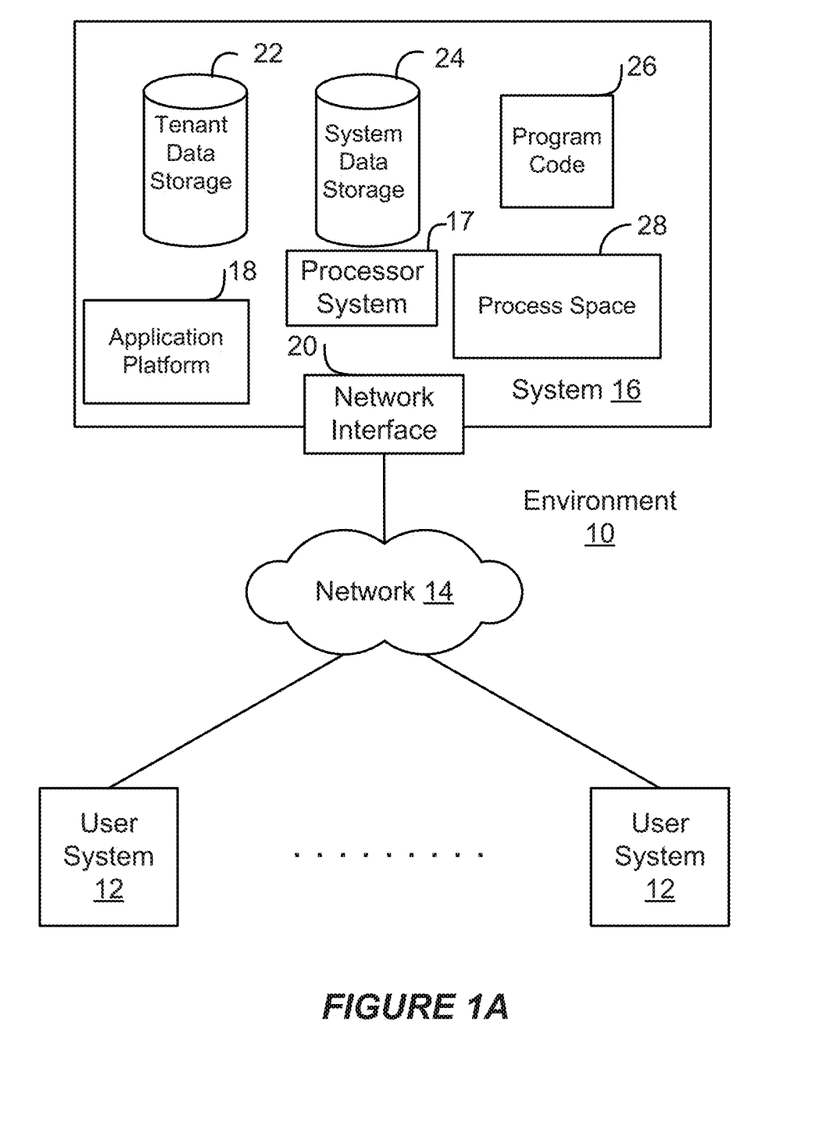
FIG. 1A is a block diagram illustrating an example of an environment in which an on-demand database service can be used according to various embodiments of the present disclosure.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data, system database 24 for storing system data, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
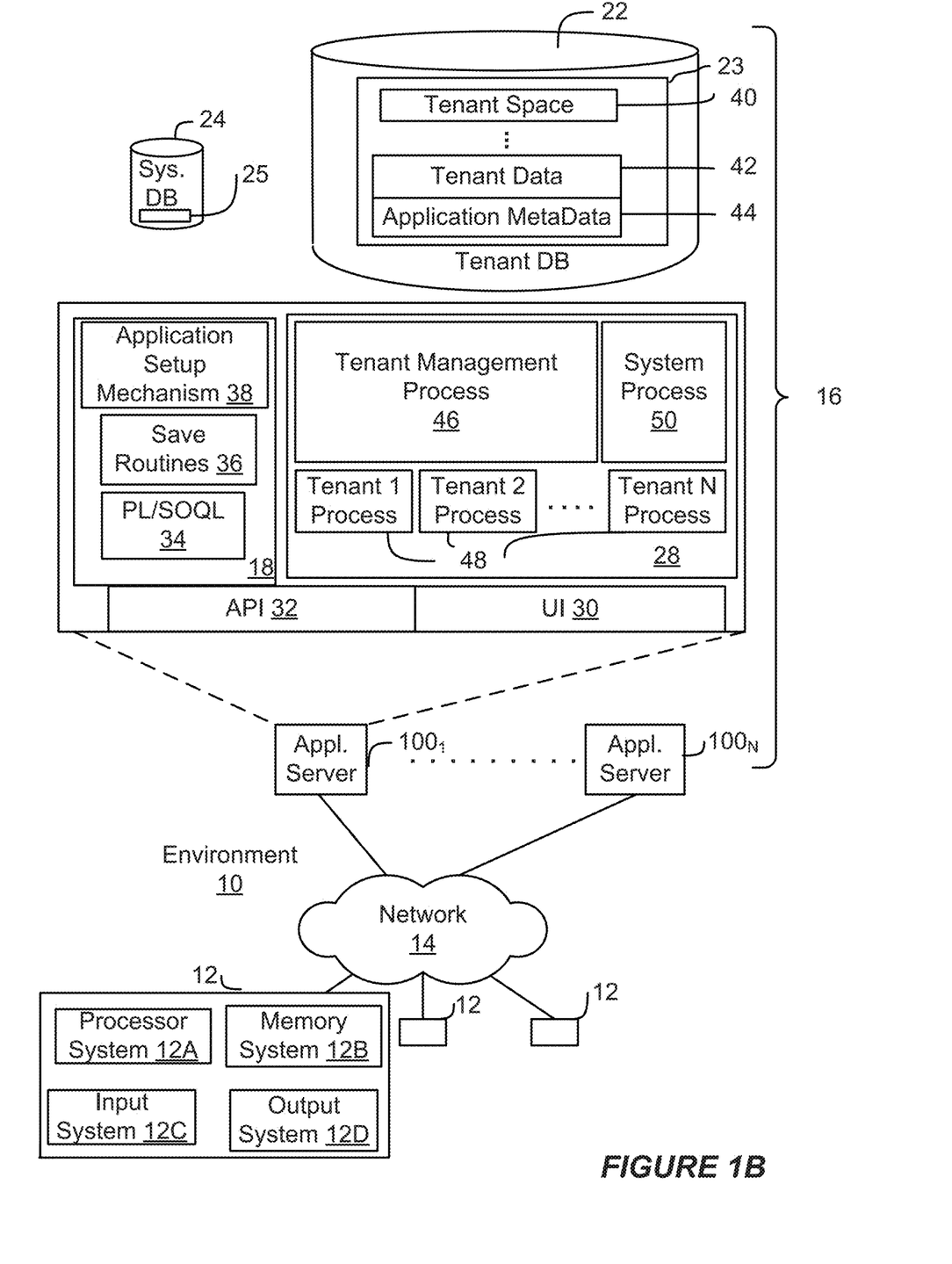
FIG. 1B is a block diagram illustrating examples of implementations of elements of FIG. 1A and examples of interconnections between these elements according to various embodiments of the present disclosure.

FIG. 1B shows a block diagram with examples of implementations of elements of FIG. 1A and examples of interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 40, which can be physically or logically arranged or divided. Within each tenant storage space 40, user storage 42 and application metadata 44 can similarly be allocated for each user. For example, a copy of a user's most recently used (MRU) items can be stored to user storage 42. Similarly, a copy of MRU items for an entire organization that is a tenant can be stored to tenant storage space 40.

The process space 28 includes system process space 50, individual tenant process spaces 48 and a tenant management process space 46. The application platform 18 includes an application setup mechanism 38 that supports application developers' creation and management of applications. Such applications and others can be saved as metadata into tenant database 22 by save routines 36 for execution by subscribers as one or more tenant process spaces 48 managed by tenant management process 46, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 44 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example of a storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of an MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Dynamically Maintaining Alarm Thresholds for Software Application Performance Management Embodiments of the present disclosure may be utilized to help with managing the performance of software applications performing various services. In some conventional systems, alarms may be set to raise an alert when a corresponding metric has breached a threshold that has been statically set by a human. When performance of the system changes (e.g, improves), a human has to go and update the threshold. Usually, in such cases, the threshold change is missed or not updated quickly enough, meaning a performance regression (e.g., a rise in CPU utilization, memory leaks, changes in network input/output, etc.) can slip through undetected, potentially negating a previous improvement. Additionally, the updating of thresholds in this manner is time consuming and may be prone to error (e.g., the human operator may mistype the updated threshold).

Embodiments of the present disclosure, by contrast, dynamically updates thresholds as metrics change, thus providing a faster, more efficient, and less error-prone solution to updating thresholds and helping to prevent performance regressions in the system from going undetected.

Figure 4:
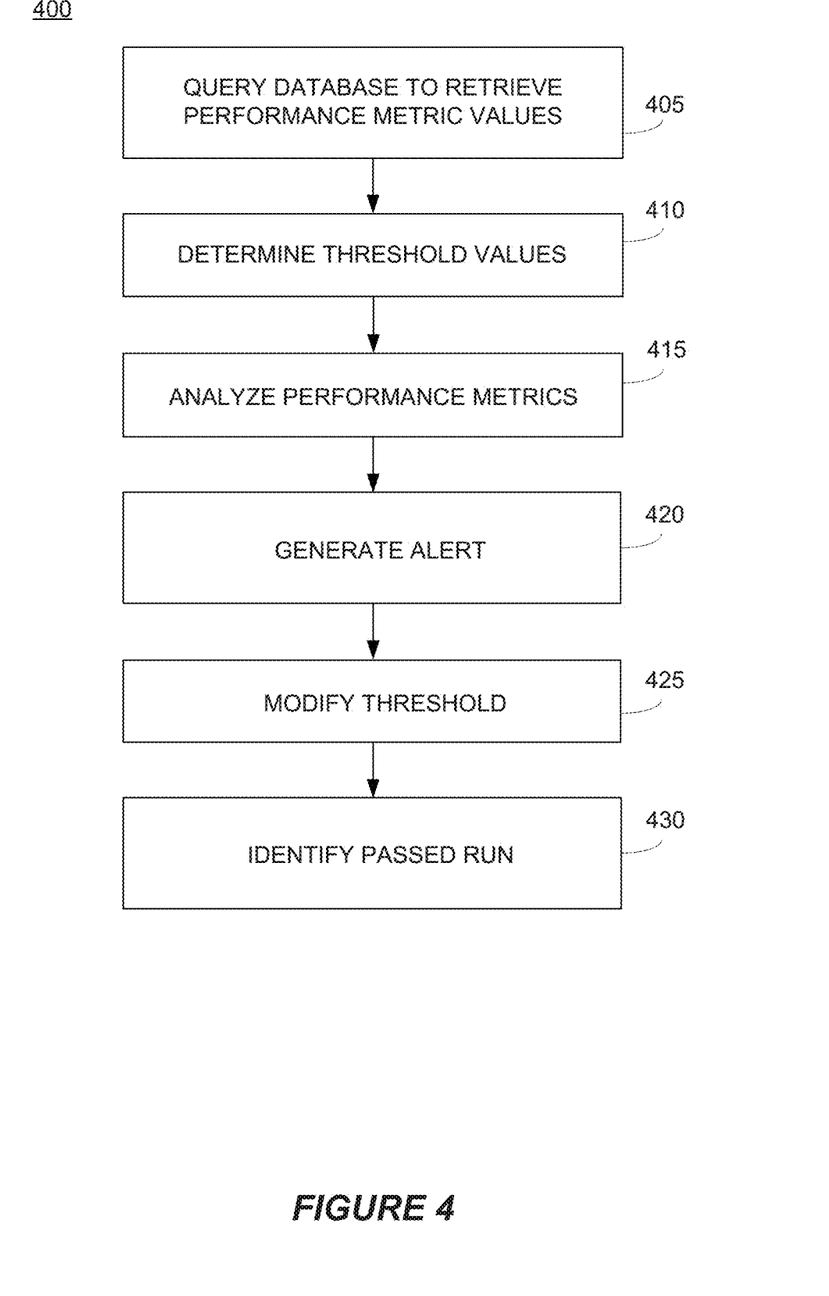
FIG. 4 is a flow diagram illustrating an example of a process according to various embodiments of the present disclosure.

FIG. 4 is a flow diagram illustrating an example of a process 400 according to various aspects of the present disclosure. Any combination and/or subset of the elements of the methods depicted herein (including method 400 in FIG. 4) may be combined with each other, selectively performed or not performed based on various conditions, repeated any desired number of times, and practiced in any suitable order and in conjunction with any suitable system, device, and/or process. The methods described and depicted herein can be implemented in any suitable manner, such as through software operating on one or more computer systems. The software may comprise computer-readable instructions stored in a tangible computer-readable medium (such as the memory of a computer system) and can be executed by one or more processors to perform the methods of various embodiments.

In this example, process 400 includes querying a database to retrieve performance metric values (405), determining threshold values for corresponding performance metrics (410), and analyzing the performance metric values in relation to the thresholds (415). Process 400 further includes generating an alert (420), modifying a threshold (425), and/or identifying a passed run (430) based on the analysis of different performance metric values.

Figure 3:
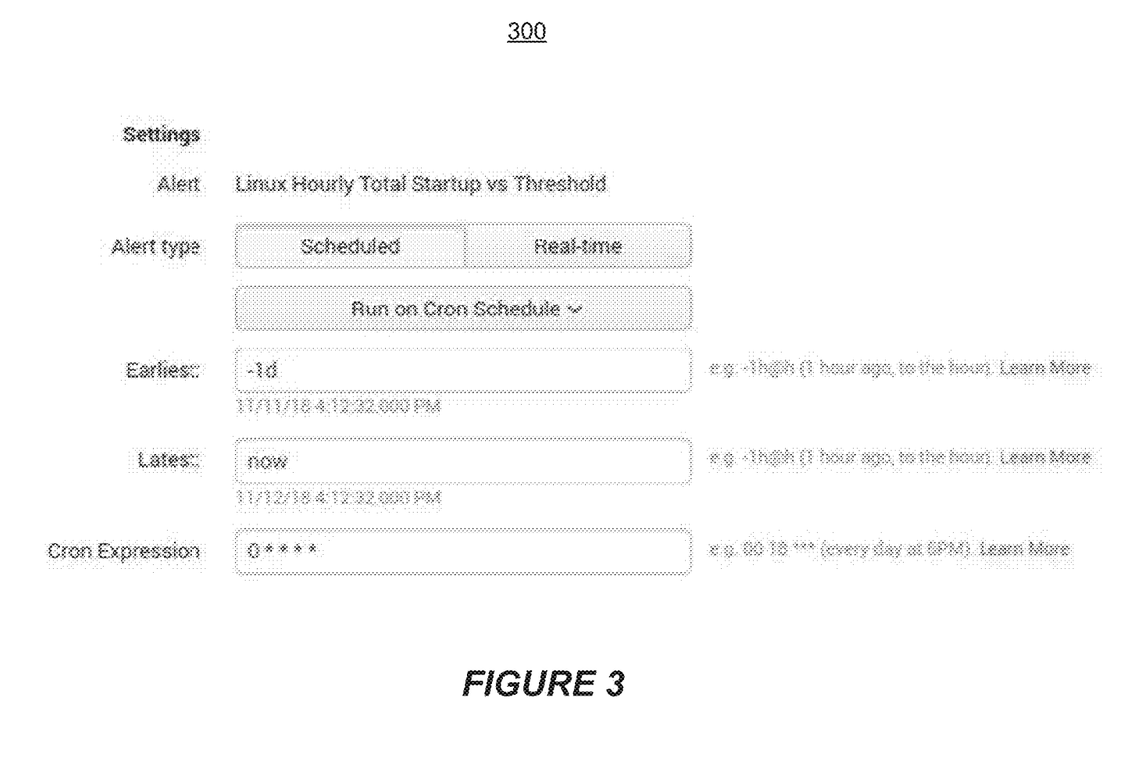
FIG. 3 illustrates an example of a user interface for setting alert features according to various aspects of the present disclosure.

As described above, a computer system (e.g., implemented by system 16 illustrated in FIGS. 1A and 1B) may query (405) one or more databases (e.g., databases 22 or 24 in FIG. 1A). Software operating on system 16 (e.g., executed by processor system 17 in FIG. 1A) may likewise perform the other features of process 400. In some embodiments, software operating in conjunction with embodiments of the present disclosure on system 16 may receive electronic communications over network 14 from a user system 12 to control one or more features of the software. For example, settings for the software (e.g., as shown in FIG. 3) may be manipulated via user system 12 and provided to the software operating on system 16 over network 14.

In process 400, the system may query (405) a database to retrieve a plurality of values for each of a plurality of computer system performance metrics. In some embodiments, the system may query the database a plurality of times (e.g., at a predetermined interval), where each query retrieves a respective plurality of values for each of a respective plurality of computer system performance metrics collected over a respective predetermined time period.

The system may determine (410) one or more threshold values for each performance metric. In some cases, for example, the system may determine two thresholds, a lower threshold and an upper threshold, between which "nominal" operation is considered to occur. In other embodiments, a single threshold value performance metric may be determined, where values above (or below) the threshold may result in generating an alert (420) and/or modifying the threshold (425). In some cases, a threshold value for a performance metric may be retrieved (e.g., from a database using a query). In other cases, the system may calculate the threshold.

In process 400, the system analyzes (415) performance metric values in relation to the threshold values for each performance metric. In some embodiments, analyzing the performance metric values in relation to a threshold value includes determining an average of values for a performance metric based on the plurality of values, and comparing the average to the threshold.

The average of values may be taken for a subset of the values measured for a given performance metric. For example, the system may retrieve values for a metric collected over a time period such as one hour, but average the values for a performance metric corresponding to a subset of the predetermined time period (e.g., values collected during a five-minute period of the hour).

In response to analyzing the performance metric values relative to the thresholds for the performance metrics, the system may generate an alert related to one or more metrics (420), modify the threshold for one or more metrics (425), and/or identify a passed run (430) for one or more metrics.

For example, the system may analyze values collected over a predetermined time period in relation to respective thresholds for each of three performance metrics (referred to below as the "first," "second," and "third" metrics/threshold values). In response to determining that a value for the first performance metric exceeds first threshold value, the system may generate an alert (420) indicating the first threshold has been exceeded. In response to determining that a value for the second performance metric is above or below the second threshold by a predetermined amount (e.g., 10%), the system may modify (425) the second threshold (e.g., to be set to the value of the second performance metric). In response to determining that a value for the third performance metric is within a predetermined range of the third threshold (e.g., +/−5%) the system may identify a passed run (430) for the third metric for the predetermined time period. In this manner, the system may perform a customized analysis for each of a plurality of performance metrics, and potentially take different actions for different metrics.

In one particular example, the system extracts the necessary information/metrics from the results of the query, and takes an average of those metrics over a predetermined time period of interest (e.g., 5 minutes, 1 day, etc.). The threshold for a metric of interest may be retrieved from the database and compared to the average. In this example, if the average of the metric for the predetermined time period is greater than the threshold, the system may generate an alert (420). If the average of the metric is less than the threshold by more than a predetermined amount (e.g., 10%), the system may modify the threshold (425) to now be the average that was just calculated. If the average of the metric is less than threshold, but not by more than a predetermined amount (e.g., 10%), the system considers the result a passed run, and does not generate an alert or modify the threshold.

The system may query (405) the database a plurality of times (e.g., on a periodic basis), where each query retrieves one or more values for each of one or more computer system performance metrics collected over a predetermined time period. In some embodiments, the system may store the threshold values for each performance metric in a lookup table.

As an example, consider an embodiment monitoring (among other things) the average startup time of a software application running on multiple lab machines. In this particular example, the startup threshold (for an average startup) is initially 112 seconds. When the queries for the lab machines are run for the last hour the system may determine that for this most recent hour the average start-up was 99 seconds. In this example, the system will modify a threshold (425) in response to identifying an average startup time that is more than 10% better than the current threshold. Since 99 seconds is more than 10% better than the previous threshold (112−99>112*0.10) the system will update the threshold to be 99 seconds going forward. However, if the next hour's run indicates an average startup time greater than 99 seconds, the system may generate an alert (420).

In this example, the system may determine the threshold value (410) for the application startup time by retrieving it from a database and setting up a lookup table (in this example comprising one row with the threshold start-time). In this example, the system runs periodic queries (every hour in this case) to get the startup times for the software application run on a set of lab machines in the last hour. The system calculates the average runtime of lab machine runs that occurred in that hour, and check the average runtime against the lookup table threshold.

In this particular example, if the average startup time is greater than the threshold retrieved from the database, the system generates and sends out an alert (420). If the average startup time is less than the threshold by more than 10%, the system modifies the threshold (425) by updating the lookup table with the new average startup as the threshold. If the average startup time is less than the threshold, but not by more than 10%, no alert is sent out, it just considered a passed run (430).

Embodiments of the present disclosure may generate alerts (also referred to herein as "alarms") to detect when a measured performance metric regresses. Continuing the application startup time example above, the system may be configured to automatically detect when application startup time regresses.

In this example, a software application is started multiple times during a predetermined time period (an hour in this example), and the time to start the application is recorded and stored in the database. For example, the system may retrieve the startup times for the last 8 hours by generating and running the following query:

```
select
    timestamp,
    latency as "Startup Time (Min)"
from
    metrics
where
    metric_name = "Application Server Startup Time"
```

Figure 2:
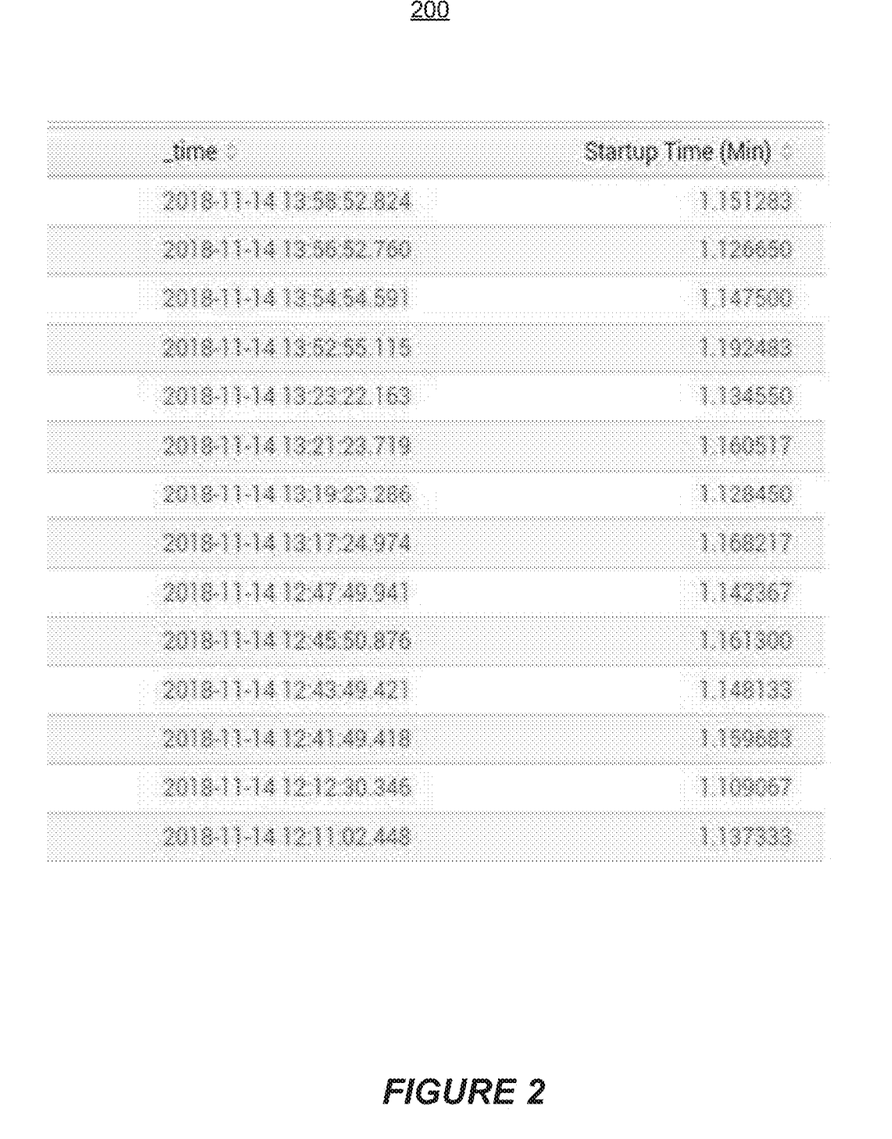
FIG. 2 is an example of data in table format retrieved from a database query according to various embodiments of the present disclosure.

In this example, running this query results in the retrieval of the dataset 200 shown in FIG. 2. As noted above, determining threshold values for performance metrics may include calculating them or retrieving pre-set ones from the database. In the latter case, the following query may be run by the system to retrieve the threshold for the "Application Server Startup Time" metric:

```
select
    threshold
from
    metric_threshold
where
    metric_name = "Application Server Startup Time"
```

Embodiments of the present disclosure may allow a user to configure features of the software operating to provide dynamic alarm threshold maintenance, such as through a user interface. FIG. 3 illustrates an example of one such user interface 300. In this example, the alarm configuration is set such that the alarm check will happen every hour using picking up the last 24 hours of startup data from the point of time the query is executed back 24 hours. The resulting database query that the system would generate based on the settings shown in user interface 300 in FIG. 3 would be:

```
select
    count(1)
from
(
select
    p50(latency) as "p50_latency"
from
    metrics
where
    metric_name = "Application Server Startup Time" and
    current_time( ) − 24H <= timestamp and
    timestamp <= current_time( )
) as metric m,
    metric_threshold mt
where
    mt.metric_name = "Application Server Startup Time" and
    mt.threshold < m.p50_latency
```

Next, the health check rule is written as follows:

```
if (count > 0) {
    // regression found
    trigger_actions( );
} else {
    // system is healthy
}
```

In this example, if p50 startup times for the past 24 hours have regressed more than threshold, "count" will be 1, and this would trigger the actions workflow to generate an alert (420). Embodiments of the present disclosure may generate a variety of alerts, including an email, a hypertext transfer protocol (HTTP) request to dependent services, a script, etc. An email generated by embodiments of the present disclosure for the example above could provide text stating: "Over the last 24 hours 'Application Server Startup Time' was 1.3 second which exceeds the threshold of 1.15."

Embodiments of the present disclosure may modify a threshold (425) in response to the analysis of the performance metrics (415). Continuing with the previous example, the system may periodically determine (every hour in this example) whether to modify the threshold. In this example, the system may run the following query to update the threshold:

```
upsert metric_threshold mt
    set mt.threshold = min(mt.threshold,
        select
            p50(latency) as "p50_latency"
        from
            metrics
        where
            metric_name = "Application Server Startup Time" and
            current_time( ) – 24H <= timestamp and
            timestamp <= current_time( )
    )
where
    mt.metric_name = "Application Server Startup Time"
```

While the above example shows a one-hour periodicity, alerts and threshold modifications may be performed by embodiments at any suitable interval. In this manner, embodiments of the present disclosure can help prevent any improvement that is made performance (i.e., startup time in the above example) isn't negated by a regression that is introduced soon after, since the threshold is constantly being lowered as system performance improves. Additionally, embodiments of the present disclosure can also help to identify new regressions soon after an improvement is made to the system. Traditional monitoring systems, by contrast, are susceptible to losing any gains made to system performance as the gains don't translate to a threshold adjustment, and such adjustments in conventional systems are inefficient and error-prone.

Furthermore, while the above example uses the average value of a performance metric, other measures may also be utilized in conjunction with the embodiments of the present disclosure, including determining minimum values, maximum values, ninety-ninth percentile values, etc. Similarly, embodiments of the present disclosure may be used in conjunction with any numeric metric data that is produced over time. While the example above concerned latencies, embodiments of the present disclosure may be used in conjunction with any other performance metric, including throughput metrics, error metrics, utilization metrics, and others.

In some embodiments, when a regression is detected, the system may send a message to another system to reverse or backout a problematic commit from a corresponding branch. Similarly, detection of a regression may cause the system to start a process for identifying and addressing software bugs/faults that corresponds to the offending commit.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
   a processor; and
   memory coupled to the processor and storing instructions that, when executed by the processor, cause the system to perform operations comprising:
   querying a database to retrieve a plurality of values for each of a plurality of computer system performance metrics, the values collected over a predetermined time period;
   determining a first threshold value for a first performance metric from the plurality of performance metrics;
   determining a second threshold value for a second performance metric from the plurality of performance metrics;
   determining a third threshold value for a third performance metric from the plurality of performance metrics;
   analyzing the plurality of performance metric values in relation to the first threshold value, the second threshold value, and the third threshold value;
   generating, based on the analysis of the plurality of performance metric values, an alert indicating that a value for the first performance metric exceeds the first threshold value;

determining an average of values for the second performance metric from the plurality of values;
comparing the average of values for the second performance metric to the second threshold value;
modifying the second threshold value based on the analysis of the plurality of performance metric values and in response to the average of values for the second performance metric exceeding the second threshold value by a predetermined amount; and
identifying a passed run for the third performance metric in response to a value for the third performance metric being less than the third threshold value by less than a predetermined amount.

2. The system of claim 1, wherein analyzing the plurality of performance metric values in relation to the first threshold value includes determining an average of values for the first performance metric from the plurality of values, and comparing the average of values for the first performance metric to the first threshold value.

3. The system of claim 2, wherein the average of values for the first performance metric are determined from a subset of values from the plurality of values, the subset of values corresponding to a subset of the predetermined time period.

4. The system of claim 2, wherein the alert is generated in response to the average of values for the first performance metric exceeding the first threshold value by a predetermined amount.

5. The system of claim 1, wherein the database is queried a plurality of times, and wherein each query retrieves a respective plurality of values for each of a respective plurality of computer system performance metrics collected over a respective predetermined time period.

6. The system of claim 1, wherein the first threshold value and the second threshold value are stored in a lookup table, and wherein analyzing the plurality of performance metric values in relation to the first threshold value and the second threshold value includes retrieving the lookup table.

7. The system of claim 1, wherein modifying the second threshold value includes setting the second threshold value to be the average of values for the second performance metric.

8. A tangible, non-transitory computer-readable medium storing instructions that, when executed by a computer system, cause the computer system to perform operations comprising:
querying a database to retrieve a plurality of values for each of a plurality of computer system performance metrics, the values collected over a predetermined time period;
determining a first threshold value for a first performance metric from the plurality of performance metrics;
determining a second threshold value for a second performance metric from the plurality of performance metrics;
determining a third threshold value for a third performance metric from the plurality of performance metrics;
analyzing the plurality of performance metric values in relation to the first threshold value, the second threshold value, and the third threshold value;
generating, based on the analysis of the plurality of performance metric values, an alert indicating that a value for the first performance metric exceeds the first threshold value;
determining an average of values for the second performance metric from the plurality of values;
comparing the average of values for the second performance metric to the second threshold value;
modifying the second threshold value based on the analysis of the plurality of performance metric values and in response to the average of values for the second performance metric exceeding the second threshold value by a predetermined amount; and
identifying a passed run for the third performance metric in response to a value for the third performance metric being less than the third threshold value by less than a predetermined amount.

9. The tangible, non-transitory computer-readable medium of claim 8, wherein analyzing the plurality of performance metric values in relation to the first threshold value includes determining an average of values for the first performance metric from the plurality of values, and comparing the average of values for the first performance metric to the first threshold value.

10. The tangible, non-transitory computer-readable medium of claim 9, wherein the average of values for the first performance metric are determined from a subset of values from the plurality of values, the subset of values corresponding to a subset of the predetermined time period.

11. The tangible, non-transitory computer-readable medium of claim 9, wherein the alert is generated in response to the average of values for the first performance metric exceeding the first threshold value by a predetermined amount.

12. The tangible, non-transitory computer-readable medium of claim 8, wherein the database is queried a plurality of times, and wherein each query retrieves a respective plurality of values for each of a respective plurality of computer system performance metrics collected over a respective predetermined time period.

13. The tangible, non-transitory computer-readable medium of claim 8, wherein the first threshold value and the second threshold value are stored in a lookup table, and wherein analyzing the plurality of performance metric values in relation to the first threshold value and the second threshold value includes retrieving the lookup table.

14. The tangible, non-transitory computer-readable medium of claim 8, wherein modifying the second threshold value includes setting the second threshold value to be the average of values for the second performance metric.

15. A method comprising:
querying a database, by a computer system, to retrieve a plurality of values for each of a plurality of computer system performance metrics, the values collected over a predetermined time period;
determining, by the computer system, a first threshold value for a first performance metric from the plurality of performance metrics;
determining, by the computer system, a second threshold value for a second performance metric from the plurality of performance metrics;
determining, by the computer system, a third threshold value for a third performance metric from the plurality of performance metrics;
analyzing, by the computer system, the plurality of performance metric values in relation to the first threshold value, the second threshold value, and the third threshold value;
generating, by the computer system based on the analysis of the plurality of performance metric values, an alert indicating that a value for the first performance metric exceeds the first threshold value;

determining an average of values for the second performance metric from the plurality of values;

comparing the average of values for the second performance metric to the second threshold value; and modifying the second threshold value, by the computer system, based on the analysis of the plurality of performance metric values and in response to the average of values for the second performance metric exceeding the second threshold value by a predetermined amount; and identifying a passed run for the third performance metric in response to a value for the third performance metric being less than the third threshold value by less than a predetermined amount.

* * * * *